3,297,689
1-ARYLIDENEAMINO - 4 - (4 - BENZHYDRYL-1-PI-
PERAZINYLCARBONYL) PIPERAZINES AND IN-
TERMEDIATE THEREFOR
John W. Cusic, Skokie, and Peter Yonan, Chicago, Ill.,
assignors to G. D. Searle & Co., Chicago, Ill., a corporation of Delaware
No Drawing. Filed Jan. 5, 1965, Ser. No. 423,582
5 Claims. (Cl. 260—240)

The present invention relates to a group of complex compounds which contain two piperazine groups. More particularly, the present invention relates to a group of compounds having the following general formula

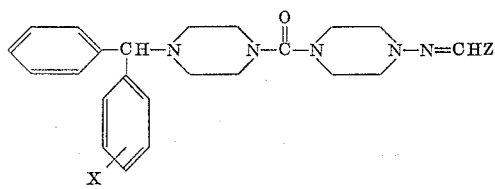

wherein X is selected from the group consisting of hydrogen, methyl, and halogen; and Z is selected from the group consisting of phenyl, tolyl, halophenyl, hydroxyphenyl, methoxyphenyl, methylenedioxyphenyl, and pyridyl. The halogens referred to above include fluorine, chlorine, bromine, and iodine. Likewise, the halophenyl radicals referred to above include fluorophenyl, chlorophenyl, bromophenyl, and iodophenyl.

The compounds of the present invention are prepared from the reaction of an aldehyde with the appropriate aminopiperazine. The reaction is carried out in an inert solvent, such as an alcohol, in the presence of a catalyst such as acetic acid. Ethanol is a particularly preferred solvent for the reaction although other alcohols such as 2-propanol can also be used. In addition, the reaction can be carried out in an inert hydrocarbon solvent such as benzene or toluene, but then it is desirable to distill the water from the reaction mixture as it is formed.

The intermediate aminopiperazine referred to above is prepared by the following series of reactions

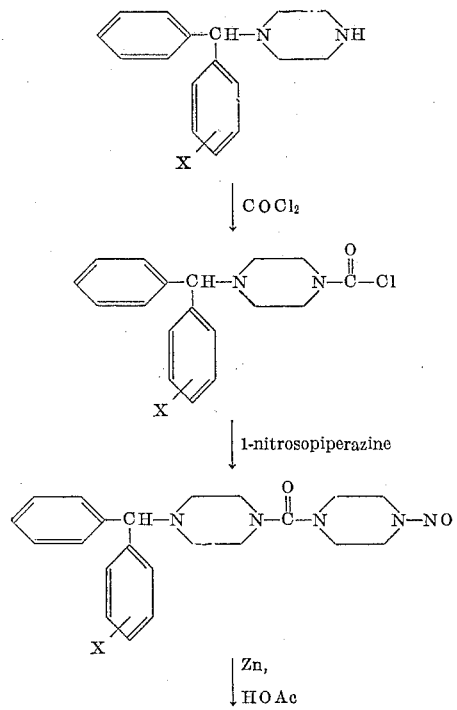

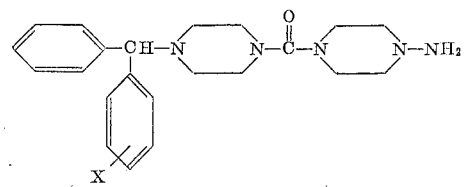

wherein X is defined as above. That is, the appropriate benzhydrylpiperazine is reacted with phosgene to give the corresponding piperazinyl-N-carbonyl chloride which is then reacted with 1-nitrosopiperazine to give the nitroso compound. The nitroso group is then reduced to give the corresponding amino compound, preferably by means of a metal-acid reducing agent such as zinc and acetic acid.

The compounds of the present invention are useful because of their pharmacological properties. Thus, these compounds possess activity as anti-ulcer agents. This activity is demonstrated by an inhibition of ulceration in the Shay rat. In addition, the present compounds possess activity as anti-hypertensive agents and as inhibitors of hepatic synthesis of cholesterol.

The organic bases of this invention form pharmaceutically acceptable, non-toxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The following examples are presented to further illustrate the present invention; they should not be construed as limiting it in spirit or in scope. In these examples, quantities are indicated in parts by weight and temperatures in degrees centigrade (° C.).

*Example 1*

A solution of 126 parts of 1-benzhydrylpiperazine in 600 parts of chloroform is added portionwise to an ice cold (0–5° C.) solution of 80 parts of phosgene in 600 parts of chloroform. The resultant mixture is stirred at 0–5° C. for 1.5 hours and then allowed to warm up to room temperature. The solution is then diluted with 1125 parts of chloroform and neutralized by the cautious addition of 150 parts of potassium carbonate. The resultant mixture is filtered and the filtrate is treated with charcoal. The solvent is evaporated from the solution to leave a residual solid which is triturated with ether to give a crystalline product. This is recrystallized from a mixture of benzene and hexane to give 4-benzhydrylpiperazine-1-carbonyl chloride melting at about 140–141° C.

In the same manner, phosgene is reacted with 1-(4-chlorobenzhydryl)piperazine and 1-(3-bromobenzhydryl) piperazine to give, respectively, 4-(4-chlorobenzhydryl) piperazine-1-carbonyl chloride and 4-(3-bromobenzhydryl)piperazine-1-carbonyl chloride.

*Example 2*

A mixture of 20 parts of 4-benzhydrylpiperazine-1-carbonyl chloride, 11 parts of 1-nitrosopiperazine, 20 parts of triethylamine and 225 parts of chloroform is refluxed for 18 hours on a steam bath. An additional 150 parts of chloroform is added to the mixture which is then washed with several portions of water. The chloroform solution is then dried and the solvent is evaporated to leave a residual oil which solidifies on standing. This is recrystallized from a mixture of benzene and hexane to give 1-benzhydryl-4-(4-nitroso-1-piperazinylcarbonyl) piperazine melting at about 152–153° C.

3

1-(4-chlorobenzhydryl)-4-(4-nitroso-1-piperazinylcarbonyl)piperazine and 1-(3-bromobenzhydryl)-4-(4-nitroso-1-piperazinylcarbonyl)piperazine are each prepared from the corresponding piperazine-N-carbonyl chloride in the same manner.

Example 3

A solution is prepared from 27 parts of 1-benzhydryl-4-(4-nitroso-1-piperazinylcarbonyl)piperazine and 210 parts of glacial acetic acid. 60 parts of water is added to the solution which is then heated to 45° C. Then, 35 parts of zinc dust is added slowly over a period of 30 minutes while the temperature is maintained at about 45° C. The mixture is then heated at about 50° C. for 1.5 hours and filtered while still hot. The filtrate is diluted with 500 parts of water, cooled in an ice bath, and made alkaline by the addition of a solution of 250 parts of sodium hydroxide in 250 parts of water. The resultant mixture is extracted with 2 portions of chloroform and the combined chloroform extracts are dried and filtered. The solvent is evaporated from the filtrate to leave a residual oil which is 1-benzhydryl-4-(4-amino-1-piperazinylcarbonyl)piperazine.

Reduction of the appropriate nitroso compound in the manner described in the above paragraph also gives 1-(4-chlorobenzhydryl)-4-(4-amino-1-piperazinylcarbonyl)piperazine and 1-(3-bromobenzhydryl)-4-(4-amino-1-piperazinylcarbonyl)piperazine.

Example 4

A solution of 5 parts of 1-benzhydryl-4-(4-amino-1-piperazinylcarbonyl)piperazine, 2 parts of piperonal, and 1 drop of acetic acid in 40 parts of ethanol is heated on a steam bath for about 5 minutes. The resultant solution is cooled and scratched to induce crystallization. The solid obtained is separated to give a crystalline product melting at about 170–171° C. This product is 1-piperonylideneamino-4-(4-benzhydryl-1-piperazinylcarbonyl)piperazine and it has the following formula

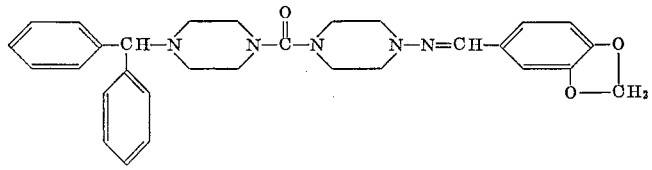

Example 5

If piperonal is reacted with the appropriate aminopiperazine according to the procedure described in Example 4, there are obtained 1-piperonylideneamino-4-[4-(4-chlorobenzhydryl)-1-piperazinylcarbonyl]piperazine and 1-piperonylideneamino-4-[4-(3-bromobenzhydryl)-1-piperazinylcarbonyl]piperazine.

Example 6

If benzaldehyde, 4-tolualdehyde, and 4-methoxybenzaldehyde are each reacted with 1-benzhydryl-4-(4-amino-1-piperazinylcarbonyl)piperazine according to the procedure described in Example 4, the products obtained are, respectively, 1-benzylideneamino-4-(4-benzhydryl-1-piperazinylcarbonyl)piperazine melting at about 194–195° C., 1-(4-methylbenzylideneamino)-4-(4-benzhydryl-1-piperazinylcarbonyl)piperazine, and 1-(4-methoxybenzylideneamino)-4-(4-benzhydryl-1-piperazinylcarbonyl)piperazine.

Example 7

3 parts of 4-hydroxybenzaldehyde is reacted with 4 parts of 1-benzhydryl-4-(4-amino-1-piperazinylcarbonyl)piperazine in 40 parts of ethanol in the presence of acetic acid according to the procedure described in Example 4. In this case, the product is 1-(4-hydroxybenzylideneamino)-4-(4-benzhydryl-1-piperazinylcarbonyl)piperazine. It melts at about 261–263° C., with decomposition, after recrystallization from a mixture of chloroform and hexane. This compound has the following formula

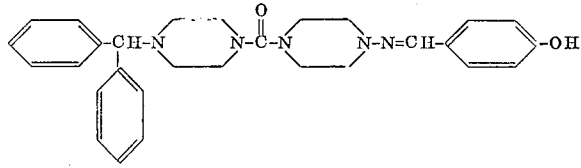

Example 8

1-benzhydryl-4-(4-amino-1-piperazinylcarbonyl)piperazine is reacted with 3-chlorobenzaldehyde, 4-bromobenzaldehyde, and pyridine-4-carboxaldehyde according to the procedure described in Example 4 to give the corresponding hydrazone in each instance.

What is claimed is:
1. A compound of the formula

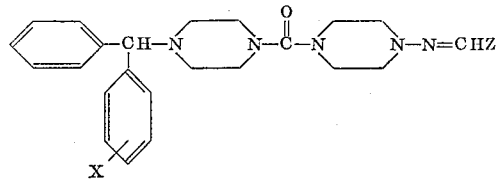

wherein X is selected from the group consisting of hydrogen and halogen and Z is selected from the group consisting of phenyl, tolyl, halophenyl, hydroxyphenyl, methoxyphenyl, methylenedioxyphenyl, and pyridyl.

2. 1-benzylideneamino-4-(4-benzhydryl-1-piperazinylcarbonyl)piperazine.

3. 1-piperonylideneamino-4-(4-benzhydryl-1-piperazinylcarbonyl)piperazine.

4. 1-(4-hydroxybenzylideneamino)-4-(4-benzhydryl-1-piperazinylcarbonyl)piperazine.

5. 1-benzhydryl-4-(4-amino-1-piperazinylcarbonyl)piperazine.

No references cited.

ALEX MAZEL, *Primary Examiner.*
HENRY R. JILES, *Examiner.*